United States Patent [19]

Johnson

[11] 3,914,663
[45] Oct. 21, 1975

[54] TIMING CIRCUIT APPARATUS FOR USE WITH VEHICLES

[75] Inventor: Lowell A. Johnson, Wheaton, Ill.

[73] Assignee: Guardian Electric Manufacturing Co., Chicago, Ill.

[22] Filed: Apr. 17, 1974

[21] Appl. No.: 461,590

[52] U.S. Cl............. 317/142 R; 307/10 R; 331/111
[51] Int. Cl.² .......................................... H01H 47/18
[58] Field of Search...... 317/141 S, 142 R, 148.5 R, 317/148.5 B; 307/10 R; 331/111

[56] References Cited
UNITED STATES PATENTS

| | | | |
|---|---|---|---|
| 2,567,928 | 9/1951 | Farmer............................. | 317/142 R |
| 3,144,568 | 8/1964 | Silliman et al..................... | 317/141 S |
| 3,154,168 | 10/1964 | Wilmot............................. | 317/141 S |
| 3,205,411 | 9/1965 | Culbertson....................... | 317/141 S |
| 3,600,638 | 8/1971 | Ward................................ | 317/141 S |

FOREIGN PATENTS OR APPLICATIONS

| | | | |
|---|---|---|---|
| 1,185,652 | 1/1965 | Germany............................ | 331/111 |
| 43-3201 | 2/1968 | Japan.................................. | 331/111 |

Primary Examiner—J. D. Miller
Assistant Examiner—Harry E. Moose, Jr.
Attorney, Agent, or Firm—Molinare, Allegretti, Newitt & Witcoff

[57] ABSTRACT

The disclosure describes a variable resistance device, such as an SCR, which is connected in series with an electrical load and a vehicle charging system which provides a source of DC voltage. Within a predetermined time period after a starting switch is closed, a resistive-capacitive circuit produces a gating voltage which triggers the SCR into conduction, thereby energizing the relay. A biasing circuit automatically alters the voltage applied to the cathode terminal of the SCR in proportion to any change in the DC source voltage, so that the predetermined time period remains constant irrespective of the changes in the source voltage. Contacts operated by the relay coil can be used to energize a utilization circuit which requires a time delay in order to reach a stable state of operation.

Additional contacts operated by the relay coil can be used to short circuit one of the components of the biasing means to return the SCR to its non-conductive state, thereby generating periodic pulses of current at time intervals displaced by the predetermined time period.

16 Claims, 2 Drawing Figures

TIMING CIRCUIT APPARATUS FOR USE WITH VEHICLES

BACKGROUND AND SUMMARY OF THE INVENTION

This invention relates to timing circuitry and more specifically relates to timing circuitry capable of operating from variable voltage power sources, such as vehicular charging and starting systems.

Timing circuits capable of producing a voltage pulse after a predetermined time delay are susceptible to a variety of applications. Such a circuit can be used as a time delay device which delays the utilization of an electrical system while the system operating conditions are stabilizing during warm up. Such a circuit also can be used as a pulse generator with a constant repetition rate capable of operating an electric clock. In the past, the accuracy and reliability of such timing circuits has depended on the availability of a constant voltage DC power supply. In the absence of such a power supply, it has been difficult, if not impossible, to design economical timing circuits of high accuracy.

As a result, there has been a dearth of accurate timing circuits capable of operating from the starting and charging systems of motor vehicles. Most motor vehicles use a lead cell battery and voltage regulator which may vary the available voltage from about 10 to 16 volts DC.

Conventional timing circuits use a resistive capacitive (RC) network to drive a high gain stage having a threshold point at which the stage will latch-up. When the voltage stored in the RC network increases above the threshold point, the high gain stage is activated. Actuation of the high gain stage may produce a pulse or a constant DC voltage which triggers a circuit having a high current or high voltage capacity. However, if such circuits are used in motor vehicles, they are unreliable due to the frequent change in DC source voltage, and they require a large number of components, both of which reduce the reliability of the overall system.

In order to overcome the deficiencies of the prior art, the applicant has invented timing apparatus in which a variable resistance means controls the flow of current through an electrical load in response to a predetermined gating voltage. The gating voltage is produced by a timing circuit which receives current from a source of variable DC voltage. A unique biasing circuit alters the biasing voltage applied to the variable resistance means in proportion to any change in the DC source voltage. As a result, the time period required for the timing circuit to produce the gating voltage remains constant irrespective of changes in the DC source voltage. By using this technique, the time periods during which the variable resistance means is rendered conductive or nonconductive in response to the gating voltage remain constant in spite of wide variations in the DC voltage produced by the source.

Accordingly, it is a principal object of the present invention to provide a circuit which produces a constant time delay between output pulses irrespective of changes in the voltage of the source or supply which operates the circuit.

It is another object of the present invention to provide a circuit of the foregoing type with a minimum number of components.

Still another object of the present invention is to provide a circuit of the foregoing type in which pulses are produced at a constant repetition rate irrespective of changes in the voltage of the source operating the circuit.

Yet another object of the present invention is to provide a timing circuit in which a variable resistance means, such as a SCR, is triggered into conduction by a resistive-capacitive circuit that is charged by a voltage source and wherein the bias voltage applied to the SCR is automatically adjusted so that the period of time required to produce the gating voltage remains constant irrespective of changes in the DC source voltage.

DESCRIPTION OF THE DRAWING

These and other objects, advantages and features of the invention will hereafter appear in connection with the accompanying drawing wherein.

DESCRIPTION OF THE PREFERRED EMBODIMENTS

Figure 1:
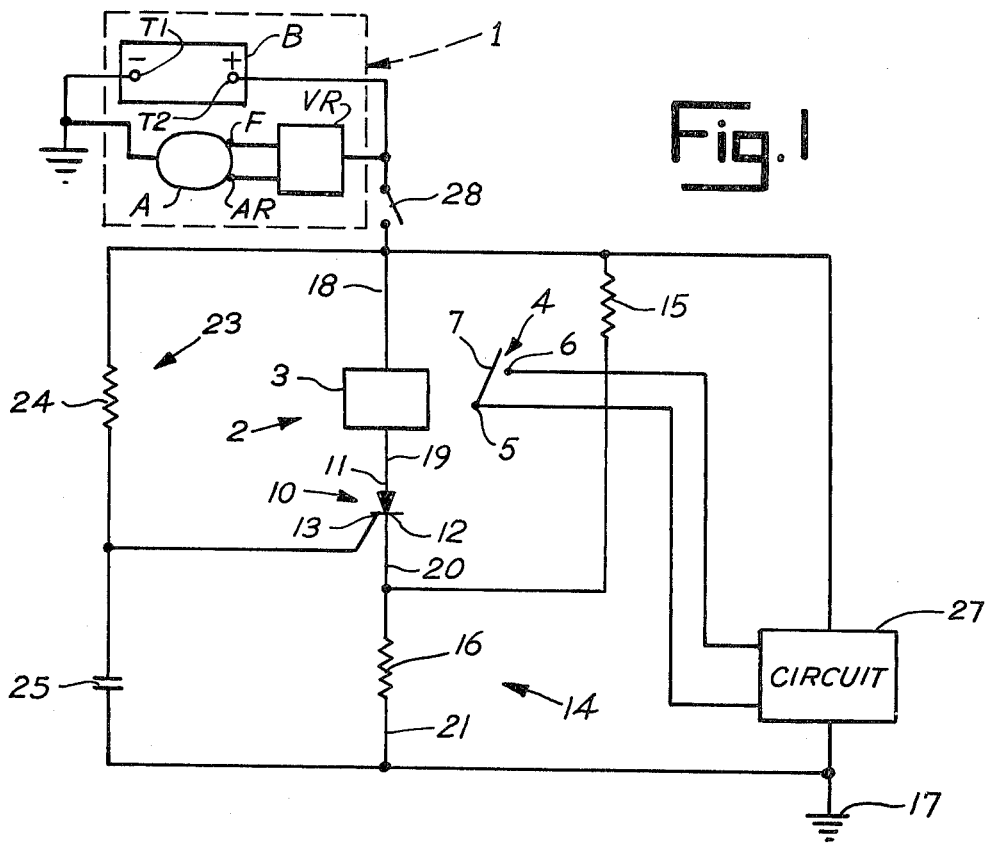
FIG. 1 is an electrical schematic diagram of a preferred form of the present invention used as a time delay circuit.

Referring to FIG. 1, one embodiment of the present invention is adapted for use in connection with a variable voltage power supply 1, such as the charging and starting system of a motor vehicle. Supply 1 includes a lead storage cell battery B having a positive terminal T2 and a negative grounded terminal T1. An alternator A driven by the vehicle engine (not shown) has a field winding terminal F and an armature winding terminal AR that are connected to a conventional voltage regulator VR. The output of regulator VR is connected to positive battery terminal T2. Power supply 1 generates DC voltage and current in a well-known manner for use by the electrical system of a vehicle.

The apparatus includes a relay 2 comprising a relay coil 3 which operates a contact assembly 4. The contact assembly includes terminals 5 and 6 and a switch arm 7 which connects terminals 5 and 6 when a current flows through coil 3.

The apparatus also includes a variable resistance thyristor, such as an SCR 10, having an anode terminal 11, a cathode terminal 12 and a control electrode 13. Those skilled in the art will appreciate that SCR 10 has a transconductive path between anode 11 and cathode 12 which is switched from its normally nonconductive state to a conductive state by the application of a predetermined gating voltage between control electrode 13 and cathode 12. SCR 10 is controlled by a unique biasing circuit comprising resistors 15 and 16 connected as shown. It should be noted that relay coil 3 and SCR 10, as well as resistor 16, are connected in series by conductors 18–21 between power supply 1 and a ground potential current sink 17. Control electrode 13 is connected to a timing network 23 comprising a resistor 24 and a capacitor 25 connected as shown.

Circuit 27 is an electrical device of the type requiring a warm-up time period to achieve stable operation. In order to operate circuit 27, switch 28 is closed so that DC power is supplied from power supply 1 to the components illustrated. SCR 10 is normally in its nonconductive state so that electrical current does not flow through relay coil 3. Resistors 15 and 16 form a voltage divider which establishes a target voltage at cathode 12. The target voltage varies in proportion to the changes in the voltage of power supply 1.

In order to switch SCR 10 to its conductive state, a predetermined gating voltage greater than the target voltage must be applied to control electrode 13. In order to supply the gating voltage, capacitor 25 accumulates charge over a predetermined time period controlled by the values of resistor 24 and capacitor 25. As soon as capacitor 25 charges to the gating voltage, the transconductive path within SCR 10 is switched to its conductive state so that electrical current flows through coil 3. In response to current flowing through coil 3, switch arm 7 connects terminals 5 and 6 which are, in turn, connected to apparatus within circuit 27 which enables the circuit to operate.

If the voltage supplied by power supply 1 increases, the target voltage at the junction of resistors 15 and 16 likewise increases so that the gating voltage needed to switch SCR 10 to its conductive state is increased. However, an increase in the supply voltage also increases the rate at which capacitor 25 charges, so that the time period between the closure of switch 28 and the switching of SCR 10 to its conductive state remains substantially constant.

Figure 2:
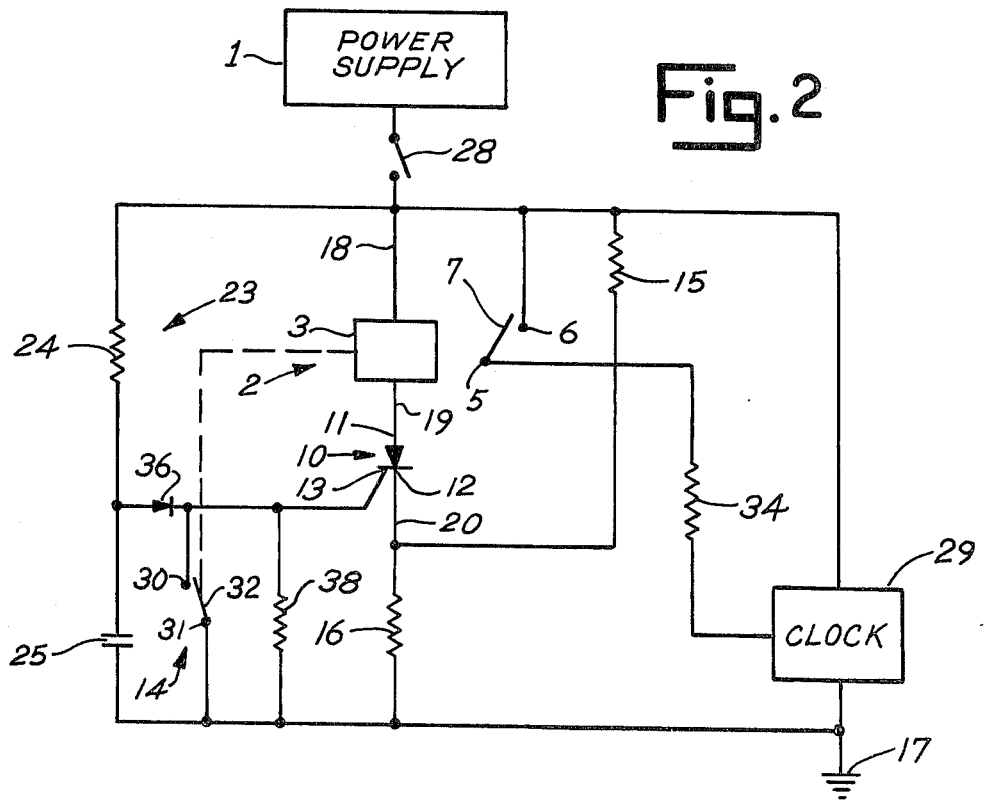
FIG. 2 is an electrical schematic diagram of a preferred form of the present invention used as a pulse generator for a clock.

Referring to FIG. 2, the like components shown in FIG. 1 are referred to by like numbers. In addition to the components shown in FIG. 1, the circuitry of FIG. 2 also includes a clock 29 which is operated by periodic pulses of constant repetition rate transmitted through a resistor 34. The circuit also includes normally open relay contacts 30 and 31 which are closed when current flows through coil 3. Alternatively, switch arm 32 may be ganged to and operated simultaneously with switch arm 7. A diode 36 and resistor 38 are added to the control circuit of SCR 10 and are connected as shown.

Normally, diode 36 is reverse biased and resistor 38 maintains electrode 13 at a low voltage which keeps SCR 10 in a nonconductive state. In order to switch SCR 10 of FIG. 2 to its conductive state, a predetermined gating voltage greater than the target voltage established by resistors 15, 16 must be applied to control electrode 13. In order to supply the gating voltage, capacitor 25 accumulates charge over a predetermined time period controlled by the values of resistor 24 and capacitor 25 and diode 36 becomes forward biased. As soon as capacitor 25 charges to the gating voltage (plus the voltage drop across diode 36), the transconductive path within SCR 10 is switched to its conductive state so that electrical current flows through coil 3. At this time, switch arm 7 connects the power supply to resistor 34 so that a pulse of current is transmitted to clock 29. At the same time, switch arm 32 short circuits resistor 38 to ground potential so that SCR 10 is switched to its nonconductive state.

After SCR 10 is switched to its nonconductive state, current ceases to flow through relay 3, and switch arms 7 and 32 are moved to the open positions shown in FIG. 2. At this time, capacitor 25 begins to charge again and a new cycle of operation begins. In summary, each time SCR 10 is switched to its conductive state, a pulse of current is supplied to clock 29 through resistor 34, thereby enabling the clock to keep accurate time. The repetition rate of the pulses remains constant over a wide range of variation in the voltage supplied by power supply 1.

Those skilled in the art will recognize that only two preferred embodiments of the invention have been disclosed herein, and that modifications and changes may be made in the embodiments without departing from the true spirit and scope of the claims. For example, the relays illustrated may be replaced by solid state switching devices.

What is claimed is:

1. Timing apparatus for use in a vehicle comprising in combination:
   an electrical load;
   vehicular generating means for supplying DC voltage and current to the load;
   variable resistance means including a first terminal and a second terminal connected at opposite ends of a transconductive path capable of being switched between a conductive state and a nonconductive state and including a control electrode for switching the transconductive path between said states in response to a predetermined gating voltage;
   first biasing means interconnecting the electrical load, source and variable resistance means for preventing current flow through the load when the transconductive path is in one of said states and for enabling current flow through the load when the transconductive path is in the other of said states;
   timing means for receiving current from the generating means at a first point in time and for generating the predetermined gating voltage;
   means for applying the voltage generated by the timing means between the control electrode and the second terminal so that the variable resistance means is switched to one of said states at a second point in time in response to the predetermined gating voltage;
   second biasing means for applying a bias voltage to the second terminal and for altering the bias voltage in proportion to the change in voltage of the generating means, whereby the time period between the first and second points in time remains substantially constant irrespective of changes in the voltage of the generating means; and
   switching means for switching the variable resistance means to the other of said states subsequent to the second point in time, so that a pulse of current is periodically conducted through the load at time intervals displaced by said time period.

2. Apparatus, as claimed in claim 1, wherein said one state is the conductive state and said other state is the nonconductive state.

3. Apparatus, as claimed in claim 1, wherein the first biasing means comprises means for connecting the generating means, electrical load and variable resistance means in series and wherein the transconductive path is normally nonconductive and is rendered conductive in response to the application of the predetermined gating voltage to the control electrode.

4. Apparatus, as claimed in claim 1, wherein the variable resistance means comprises a thyristor.

5. Apparatus, as claimed in claim 4, wherein the thyristor comprises a silicon controlled rectifier.

6. Apparatus, as claimed in claim 1, wherein the timing means and means for applying comprises:
   a resistor and a capacitor connected in series;
   means for connecting the resistor and capacitor between the generating means and ground potential; and means for connecting the junction of the resistor and capacitor to the control electrode.

7. Apparatus, as claimed in claim 2, wherein said second biasing means comprises a resistor connected between the second terminal and ground potential and wherein the switching means comprises means for momentarily short-circuiting the resistor in response to the conduction of current through the load.

8. Apparatus, as claimed in claim 7, wherein the load comprises a relay coil and a contact operated by the relay coil for transmitting a pulse of current from the generating means each time current flows through the relay coil and wherein the switching means comprises a second contact operated by the relay coil for short-circuiting said resistor each time current flows through the relay coil.

9. Timing apparatus for use in connection with a source of DC voltage and current comprising in combination:
an electrical load for receiving the DC voltage and current;
variable resistance means including a first terminal and a second terminal connected at opposite ends of a transconductive path capable of being switched between a conductive state and nonconductive state and including a control electrode for switching the transconductive path between said states in response to a predetermined gating voltage;
first biasing means interconnecting the electrical load and variable resistance means for preventing current flow through the load when the transconductive path is in one of said states and for enabling current flow through the load when the transconductive path is in the other of said states;
timing means for receiving current from the source at a first point in time and for generating the predetermined gating voltage;
means for applying the voltage generated by the timing means between the control electrode and the second terminal so that the variable resistance means is switched to one of said states at a second point in time in response to the predetermined gating voltage;
second biasing means for applying a bias voltage to the second terminal and for altering the bias voltage in proportion to the change in voltage of the source, whereby the time period between the first and second points in time remains substantially constant irrespective of changes in the source voltage; and
switching means for switching the variable resistance means to the other of said states subsequent to the second point in time, so that a pulse of current is periodically connected through the load at time intervals displaced by said time period.

10. Apparatus, as claimed in claim 9, wherein said one state is the conductive state and said other state is the nonconductive state.

11. Apparatus, as claimed in claim 9, wherein the first biasing means comprises means for connecting the source, electrical load and variable resistance means in series and wherein the transconductive path is normally nonconductive and is rendered conductive in response to the application of the predetermined gating voltage to the control electrode.

12. Apparatus, as claimed in claim 9, wherein the variable resistance means comprises a thyristor.

13. Apparatus, as claimed in claim 12, wherein the thyristor comprises a silicon controlled rectifier.

14. Apparatus, as claimed in claim 9, wherein the timing means and means for applying comprises:
a resistor and a capacitor connected in series;
means for connecting the resistor and capacitor between the source and ground potential; and
means for connecting the junction of the resistor and capacitor to the control electrode.

15. Apparatus, as claimed in claim 9, wherein said second biasing means comprises a resistor connected between the second terminal and ground potential and wherein the switching means comprises means for momentarily short-circuiting the resistor in response to the conduction of current through the load.

16. Apparatus, as claimed in claim 15, wherein the load comprises a relay coil and a contact operated by the relay coil for transmitting a pulse of current from the source each time current flows through the relay coil and wherein the switching means comprises a second contact operated by the relay coil for short-circuiting said resistor each time current flows through the relay coil.

* * * * *